US006454557B1

(12) United States Patent
Chun et al.

(10) Patent No.: US 6,454,557 B1
(45) Date of Patent: *Sep. 24, 2002

(54) THERMOFORMING MACHINE WITH LINEAR RECIRCULATION OF SHEET HOLDING FRAMES

(75) Inventors: Victor L. Chun, Midland; Albert W. Arends, Gladwin; Roland Karklin, Beaverton, all of MI (US)

(73) Assignee: Brown Machine, LLC., Beaverton, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/394,561

(22) Filed: Sep. 10, 1999

Related U.S. Application Data

(62) Division of application No. 08/986,977, filed on Dec. 8, 1997, now Pat. No. 5,980,231.

(51) Int. Cl.[7] ................................................ B29C 51/04
(52) U.S. Cl. .................... 425/397; 425/387.1; 425/388; 425/400; 425/403.1; 425/DIG. 48; 425/DIG. 53
(58) Field of Search .......................... 425/387.1, 388, 425/397, 400, 403.1, 185, DIG. 48, DIG. 53

(56) References Cited

U.S. PATENT DOCUMENTS

| 3,466,706 A | * | 9/1969 | Asano | 425/388 |
| 3,574,807 A | * | 4/1971 | Heavener | 425/388 |
| 3,600,746 A | * | 8/1971 | Kostur | 425/383 |
| 4,555,377 A | * | 11/1985 | Whiteside et al. | 425/397 |
| 4,938,678 A | * | 7/1990 | Oulman | 425/397 |
| 4,975,236 A | * | 12/1990 | MacLachlan | 264/553 |
| 5,843,492 A | * | 12/1998 | McCorry | 425/DIG. 48 |
| 5,863,568 A | * | 1/1999 | Tomita et al. | 425/185 |

\* cited by examiner

*Primary Examiner*—Jan H. Silbaugh
*Assistant Examiner*—Thu Khanh T. Nguyen
(74) *Attorney, Agent, or Firm*—John R. Benefiel

(57) ABSTRACT

A thermoforming machine utilizes two clamping frames to advance cut sheets through heating and forming stations, with the clamping frames returned via an overhead path above the oven in the heating station. Pneumatic cylinders arranged about the inner perimeter of the frames are operated to grip the sheet and release the sheets, which are pressurized and released via fluid connections established when the frames are lifted from a transfer bar structure at the loading and forming stations. The clamping frames have pivoted end sections which are engaged by extendible gear posts at the forming station to bend the clamped sheet into greater conformity with the tooling shape prior to forming.

6 Claims, 15 Drawing Sheets

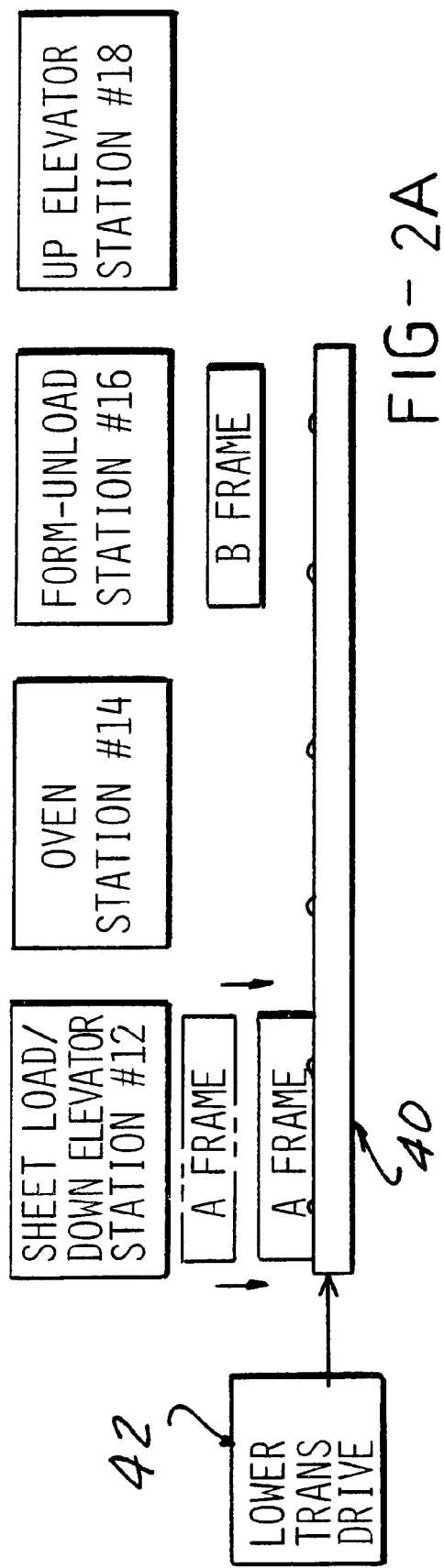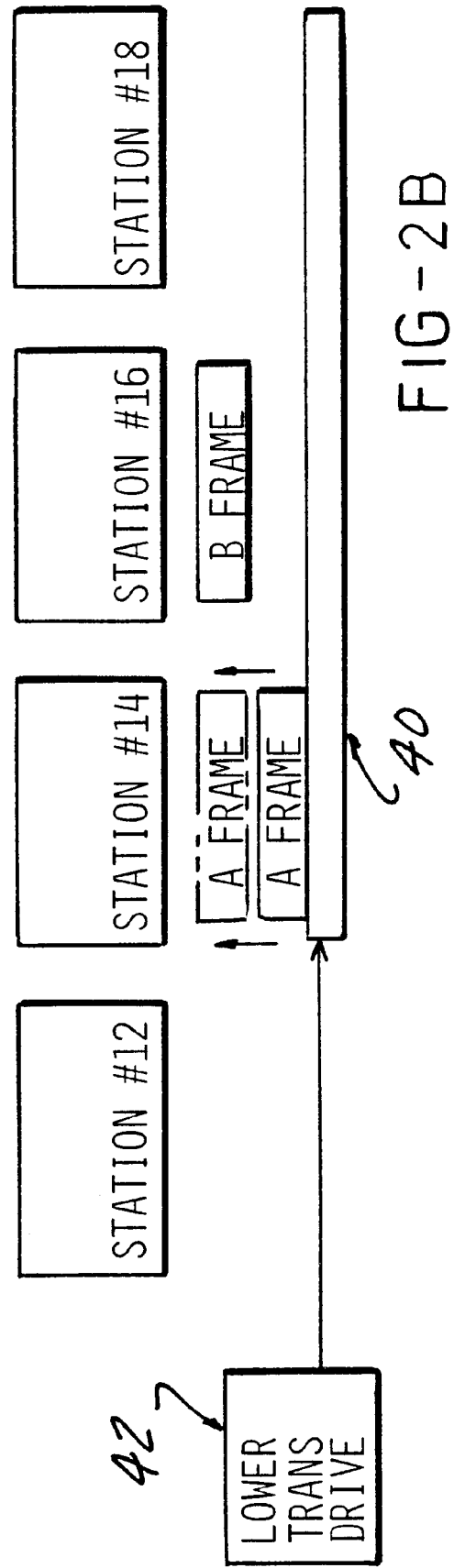

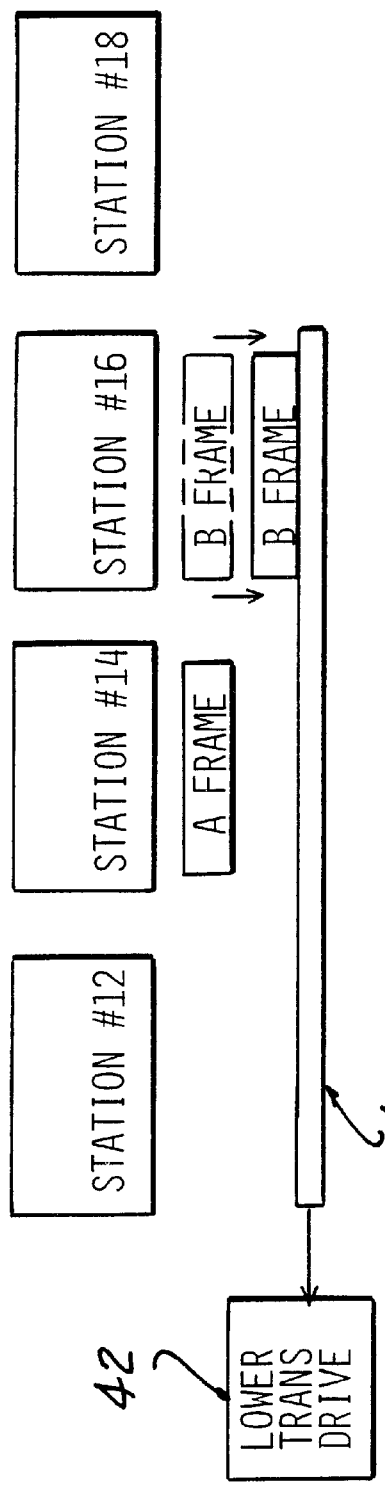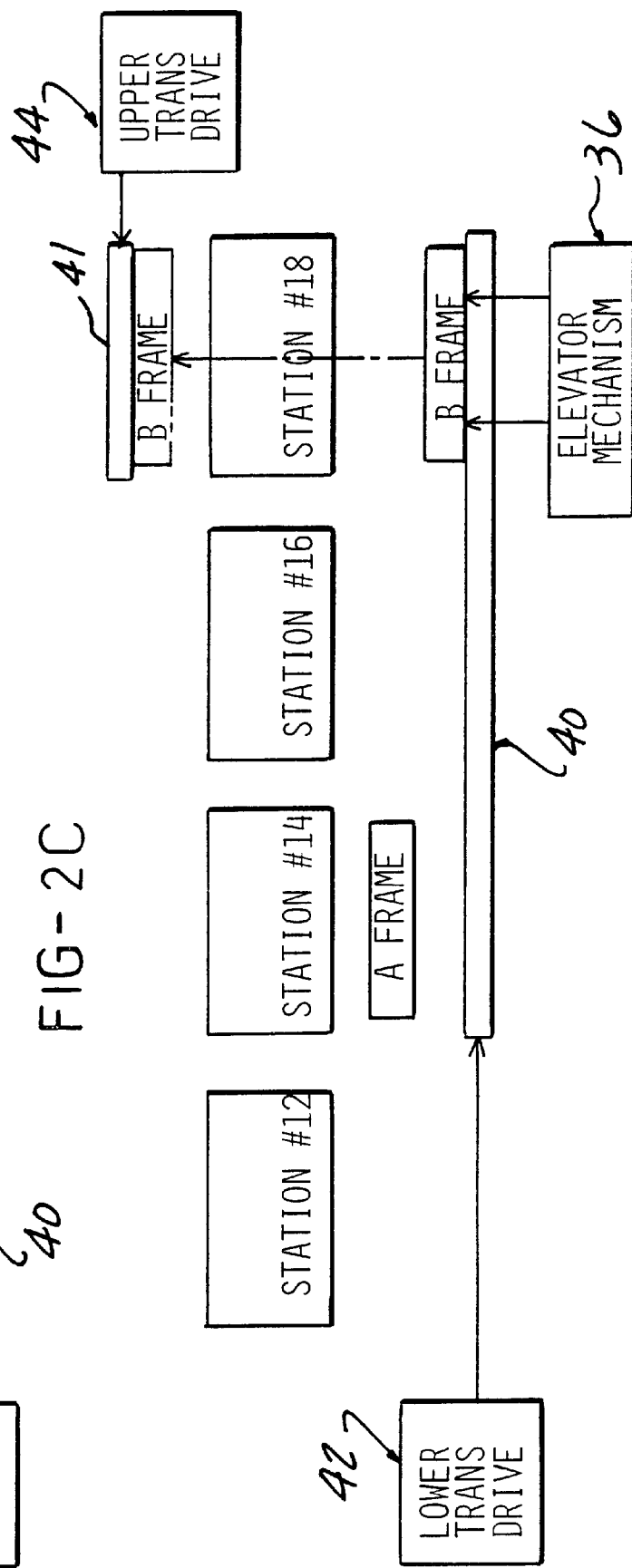

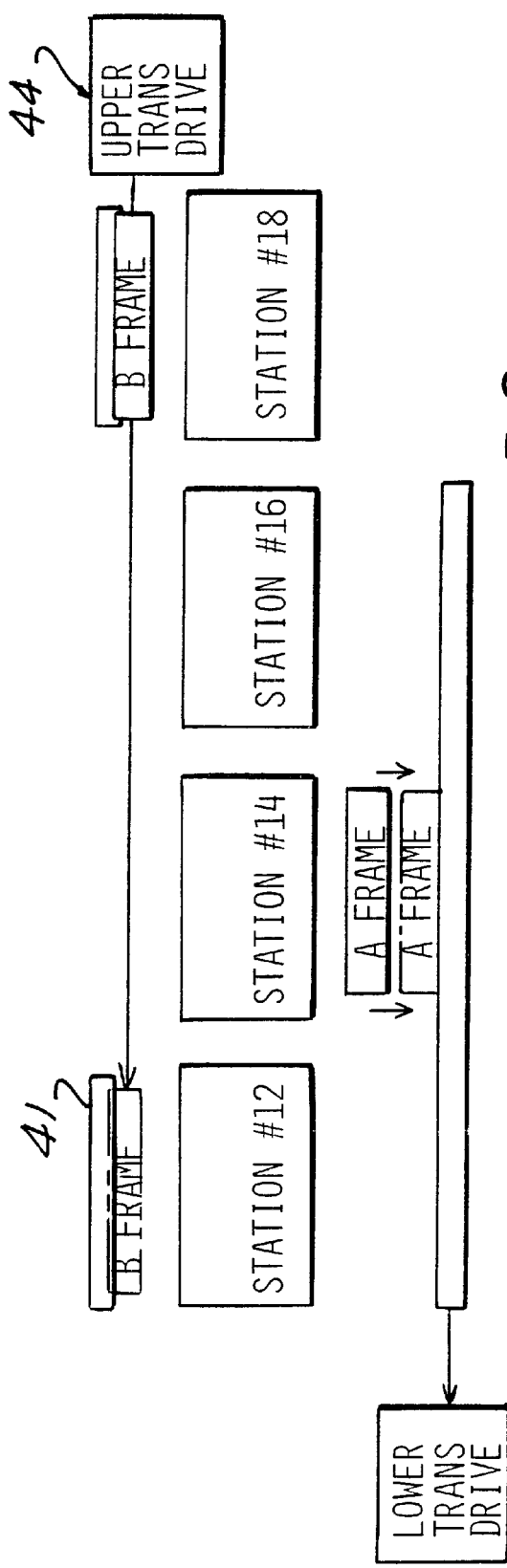
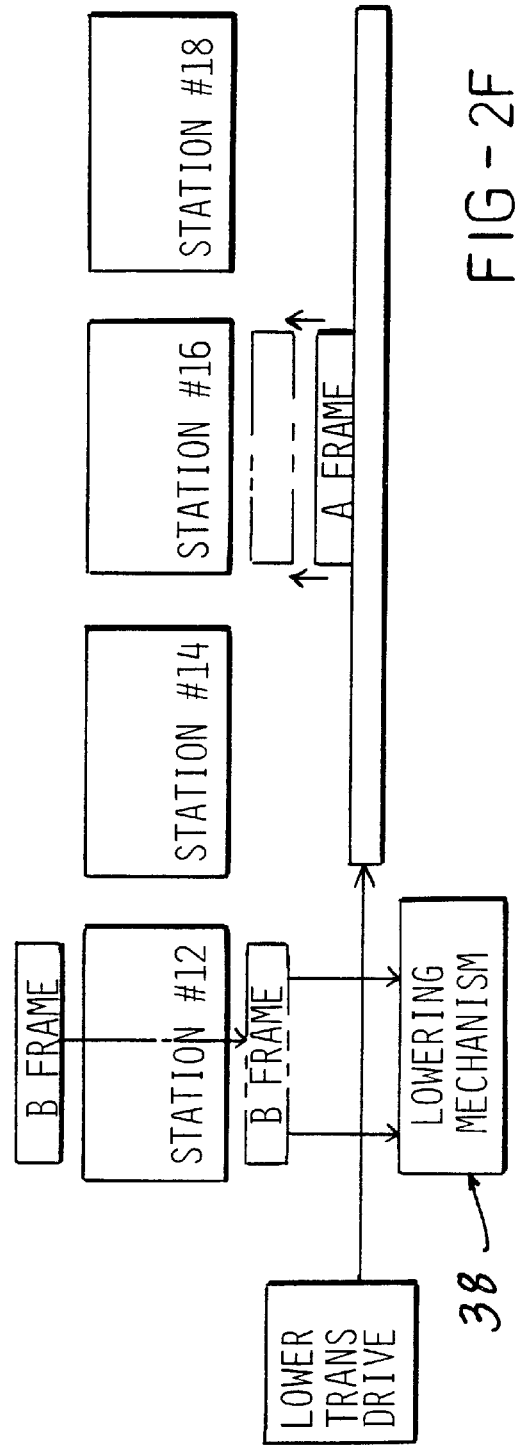
FIG-2E
FIG-2F

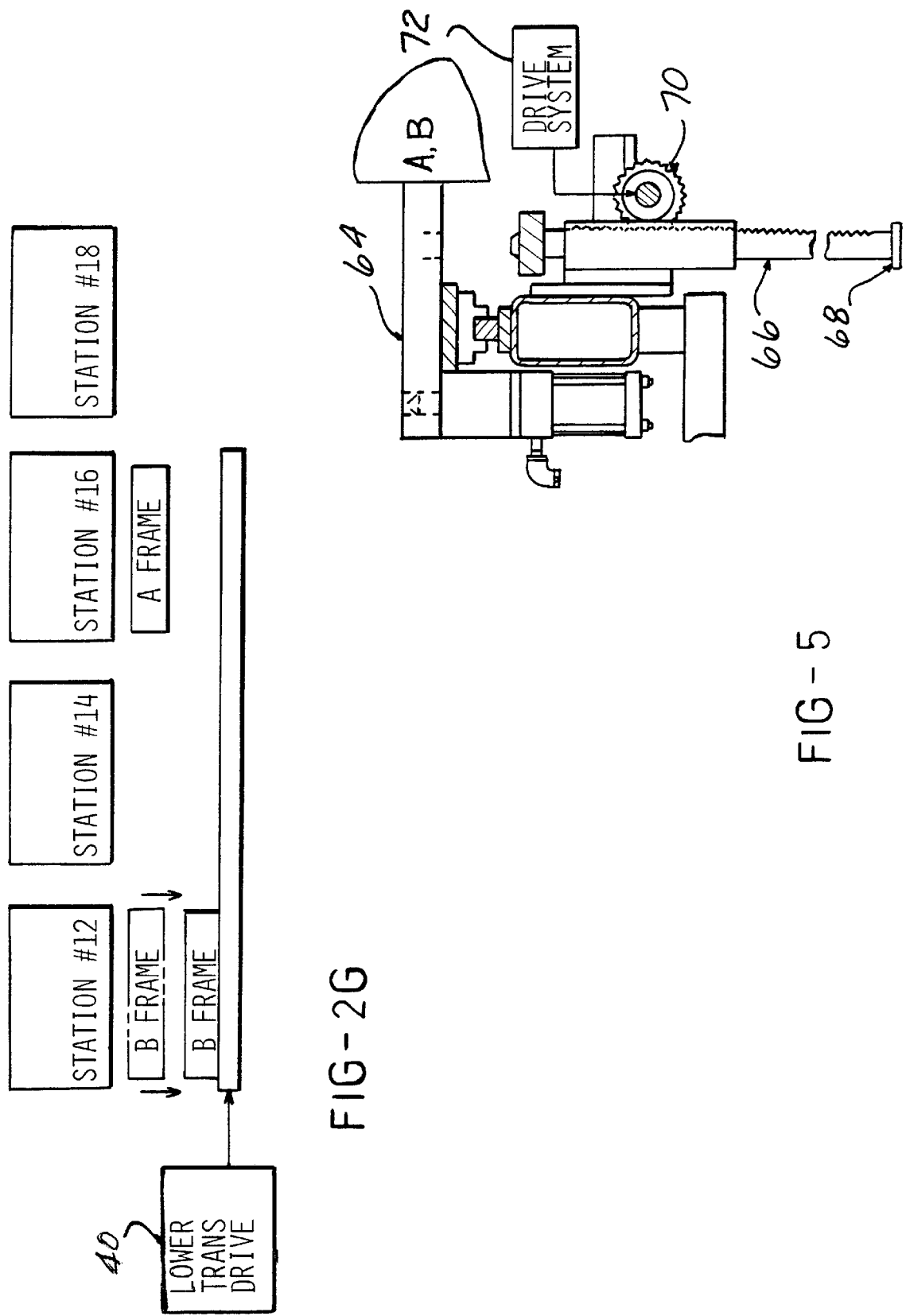

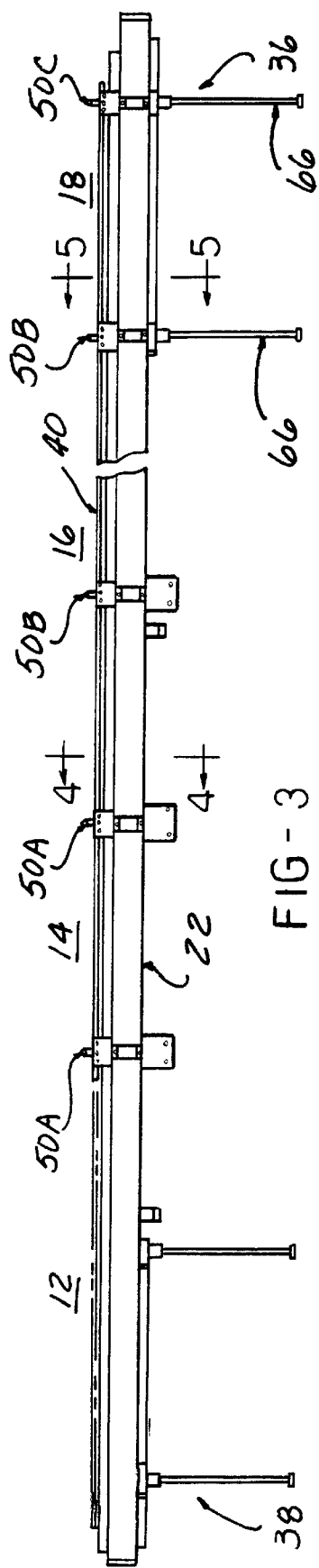
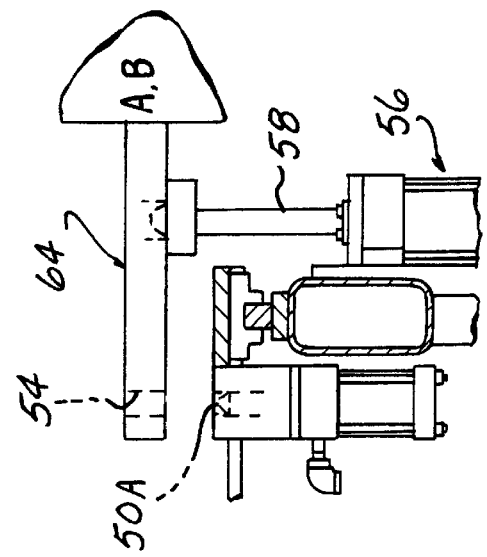
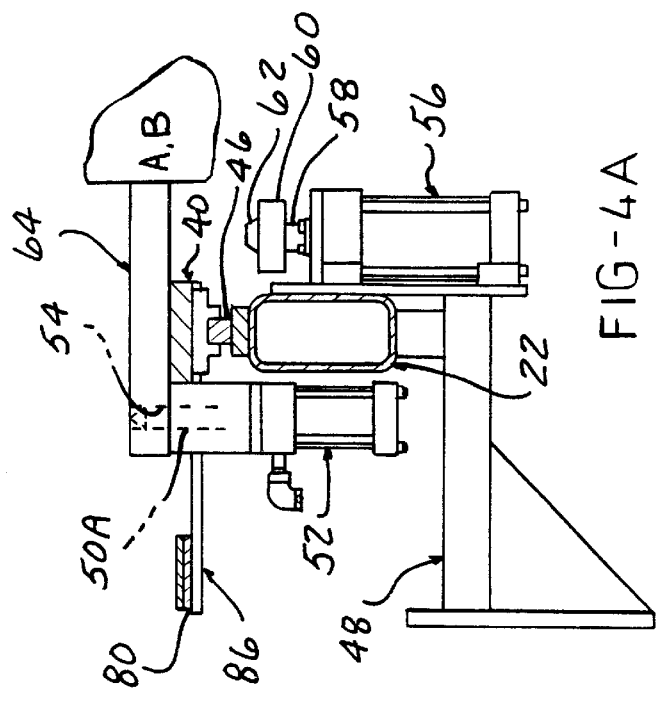
FIG-3
FIG-4B
FIG-4A

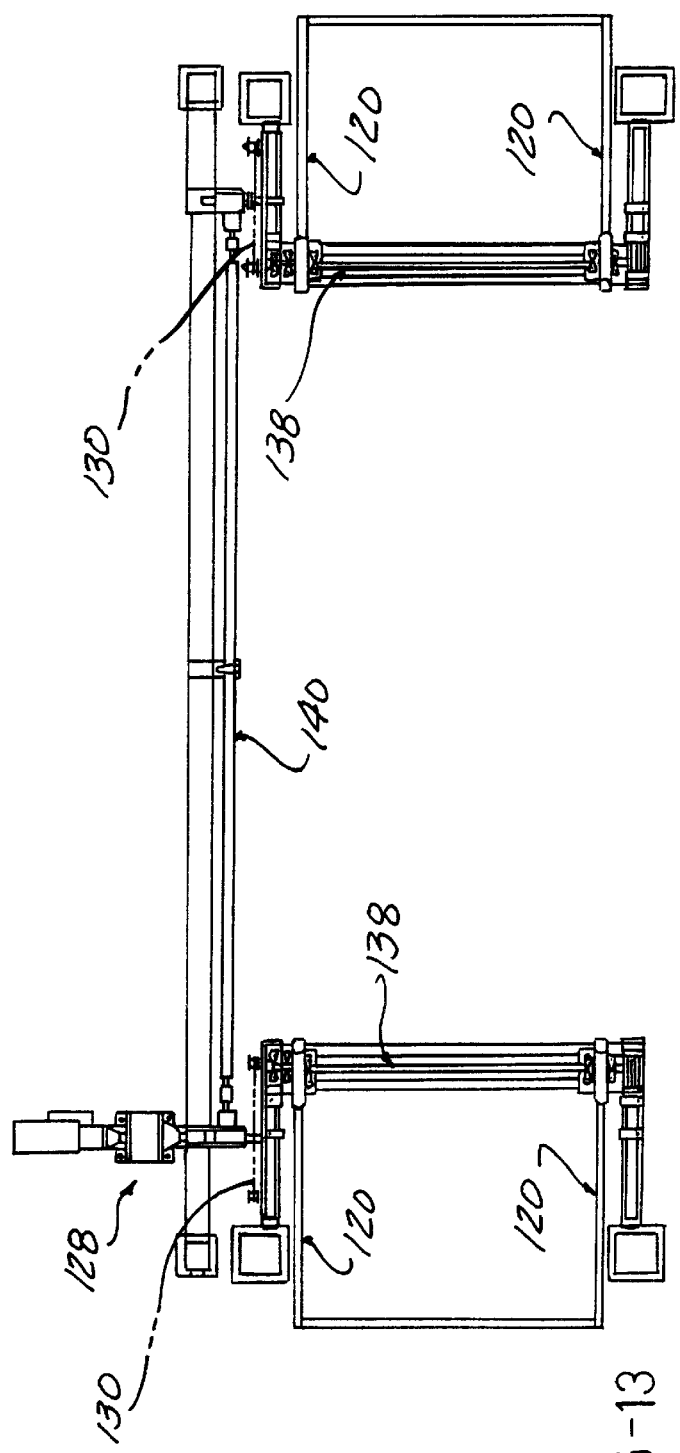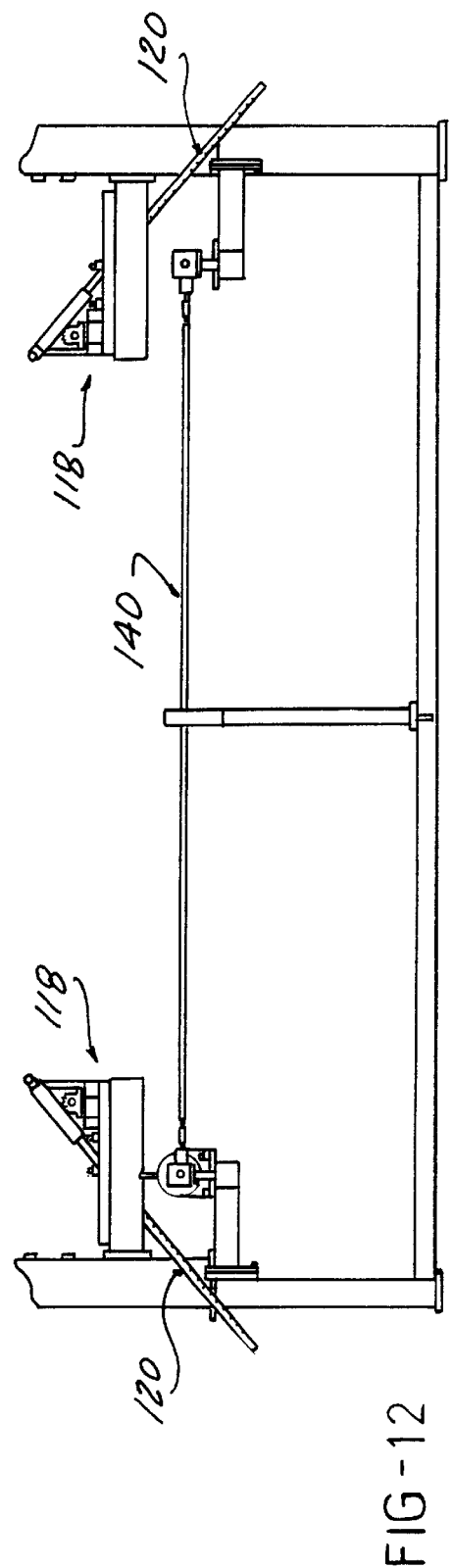
FIG-13
FIG-12

THERMOFORMING MACHINE WITH LINEAR RECIRCULATION OF SHEET HOLDING FRAMES

CROSS REFERENCE TO RELATED APPLICATION

This application is a division of U.S. Ser. No. 08/986,977, filed Dec. 8, 1997 now U.S. Pat. No. 5,980,231.

BACKGROUND OF THE INVENTION

This invention concerns thermoforming machines of the type in which thermoplastic sheets are first heated in an oven and then transferred to a forming station where a heated sheet is drawn onto tooling forms by vacuum and/or air pressure to be formed into an article.

In some instances, a clamping frame is used to hold thinner sheets which would otherwise become too weak when heated to be transferred between stations in the machine.

When using a clamping frame, a continuous in-line process is not possible as the clamping frames must be returned to the first station and reloaded with a cut sheet.

Rotary transfer thermoforming machines are known such as described in U.S. Pat. No. 3,925,140 issued on Dec. 9, 1975, which use continuous rotation of a carrier member to carry the frames through the station and to return the frames to a load/unload station after successive rotation through the heating and forming stations.

For very large articles, rotary transfer thermoforming machines occupy excessive plant floor space.

An in-line shuttle transfer has also been used, but this either is too slow if a single clamping frame is used, or requires two molding stations on either side of an oven.

Another problem is encountered in thermoforming parts with substantially angled deep portions, as excessive stretching of the material would occur if the sheet is simply formed onto the tool shape.

Draping techniques are sometimes employed for closed shapes forming dished containers, with vacuum (or air pressure) causing a pronounced sagging of the sheet material preparatory to the forming step. Such technique is not useable with a nonclosed shape or with angled ends connected with a flat center section.

U.S. Pat. No. 4,744,848 issued on May 17, 1988, describes a frame with hinged side portions which floats to allow forming with minimal stretching. This arrangement relies on engagement with a male and female mold to cause hinging of the frame ends which in turn bends the sheets into closer conformity with the mold contours prior to forming. See also U.S. Pat. No. 3,574,807 issued on Apr. 13, 1971, which describes a frame hinged in the middle to form an angled article shape.

These patents do not disclose an adaptation of a hinged clamping frame to automated thermoforming apparatus.

It is an object of the present invention to provide a frame having a section pivot capability for sharply angled elongated parts which is adapted to an automated system and which does not require engagement with a male and female contour to be actuated.

SUMMARY OF THE INVENTION

These objects and others which will become apparent upon a reading of the following specification and claims are accomplished by a linear transfer system for a set of two clamping frames.

The clamping frames are each successively moved through a load station, heating or oven station, a forming station, and an elevator/return station by a reciprocated transfer bar structure. Each clamping frame is slightly elevated in the heating, forming, and elevator/return stations to allow retraction of the transfer bar structure to receive a trailing clamping frame for separate advance.

Each clamping frame is elevated to a height above the heating station oven, and transferred back over the top of the oven, to a position above the loading station. After partial lowering, a cut sheet is loaded into the frame, which is thereafter lowered onto the transfer bar structure.

Each clamping frame has pivoted end sections which are each engaged by pairs of extensible gear posts when each frame is in the forming station, the posts each advancing a cam roller into and out of engagement with one of a pair of side channels on either side of the frame by operation of a drive system. The pivoting of the end sections brings the clamped sheet into closer conformity to the mold surfaces. The gear posts are retracted to disengage the cam rollers with the side channels to allow advance of the clamping frame to the elevator/return station.

An array of pneumatic cylinders and a series of clamping bars are arranged around the inner perimeter of the clamping frame. The cylinders are operated to retract or advance the clamping bars by application of pneumatic pressure communicated through manifold bars engaging one of the lift plates protruding from each end of the clamping frame.

The manifold plates are mounted on elevating cylinders located at the load and form stations so as to establish a fluid connection to the cylinders when the clamping frame is raised off the transfer bars.

In the load station a cut sheet is raised within the clamping frame, and the cylinders operated to clamp the cut sheet in the clamping frame.

In the forming station, the cylinders are retracted as the sheet is formed to release the sheet and allow removal of the formed article.

This invention allows a very large sharply angled article to be efficiently formed in an automated system by pivoting of the clamping frame end sections in the forming station by a disengageable drive.

BRIEF DESCRIPTION OF THE DRAWINGS

FIGS. 2A through 2G are a diagrammatic view depicting the linear movement of two clamping frames through the machine of FIG. 1.

FIG. 3 is a side elevational view of the lower clamping frame transfer system.

FIG. 4A is a view of the section 4—4 in FIG. 3 with a fragmentary portion of a clamping frame resting on the transfer bar structure.

FIG. 4B is the same section as FIG. 4A but showing the clamping frame raised off the transfer bars.

FIG. 5 is a view of section 5—5 in FIG. 3.

FIG. 12 is an end elevational view of the clamping frame pivoting system.

FIG. 13 is a plane view of the clamping frame pivoting system.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
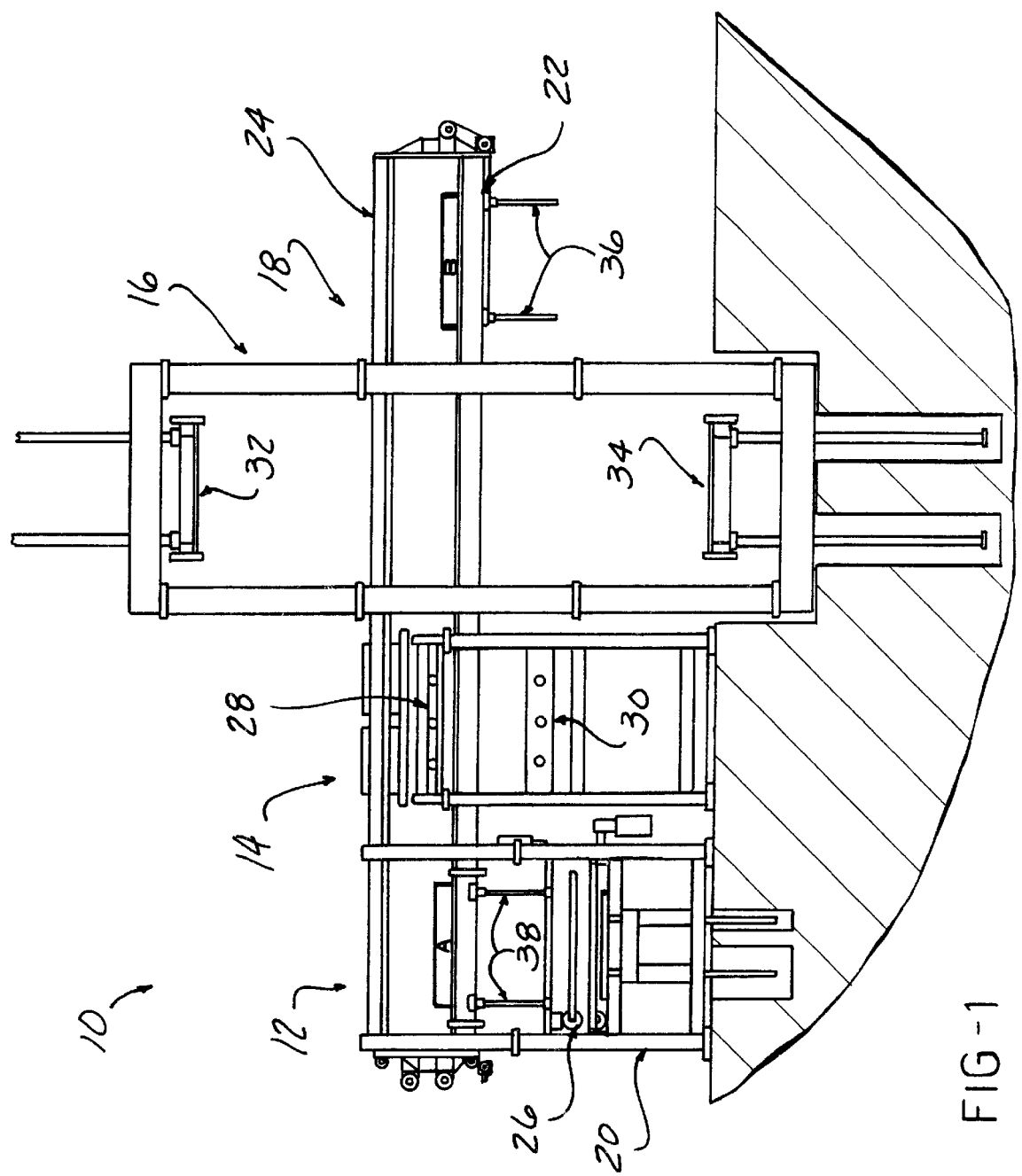
FIG. 1 is a side elevational view of a thermoforming machine according to the invention.

Referring to FIG. 1, a thermoforming machine 10 according to the present invention is shown.

The machine 10 includes a loading/return station 12, a heating station 14, a forming station 16 (shown without any tooling), and an elevating/return station 18. The machine components are supported on a machine framework 20.

Lower transfer system support rails 22 extend through the stations 12 through 18 and return or upper transfer support rails 24 extend back above and along the stations 12 through 18 (although extending below the upper platen forming station 16).

The loading/return station 12 includes a sheet cut off and loading apparatus 26 for loading a sheet to be formed into a clamping frame. The basic arrangement of this equipment will be described hereinafter.

A pair of clamping frames A, B, are separately and successively advanced from the loading station 12 through stations 14 through 18 on a transfer bar structure 40 (FIG. 2) the lower rails 22, and hence returned via the upper rails 24.

Upper and lower heating panels 28, 30 forming an oven are disposed in the heating station 14, together with a lower shield, the lower shield and/or oven moveable to clear a sagging heated sheet. Such heating ovens and shields are well known and do not form a part of the present invention and hence are not themselves described in detail herein.

The forming station 16 includes upper and lower platens 32, 34 for receiving tooling for forming the sheet into an article and unloading the formed article. Since such tooling and article handling apparatus also well known, and do not themselves form a part of the invention, further details will not be set forth herein, except in connection with the pivoting of sections of the clamping frames to facilitate the forming process, as will be described hereinafter.

The elevating/return station 18 has an elevator mechanism which comprises a set of four elevator gear posts 36 driven simultaneously to raise a clamping frame A or B from the lower rails 22 to the upper rails 24 for return transfer to station 12. A lowering mechanism also including a set of four lowering gear posts 38 are driven to lower the returned clamping frame A or B released from a transfer bar structure 41 on the upper rails 24 (FIG. 1) to a loading position and thereafter onto the lower rails 22 to be ready for another cycle.

FIGS. 2A through 2G diagrammatically depict the basic machine cycles and movement of the frames A and B through the machine.

In FIG. 2A, clamping frame A rests on a transfer bar structure 40, and clamping frame B is raised out of engagement with the transfer bar structure 40 in station 16. Lower transfer drive 42 is activated to advance clamping frame A from station 12 to station 14, where it is lifted clear of the transfer bar structure 40, as indicated in FIG. 2B.

The transfer bar structure 40 is then retracted as shown in FIG. 2C and the B frame is lowered there unto and then advanced to the return station (FIG. 2D after removal of the formed part).

The elevator gear posts 36 lift the B frame off the advanced transfer bar structure 40 upwardly to an overhead upper transfer bar 41 driven by upper transfer drive 44. The B frame is captured by activation of gripper mechanisms on the upper transfer bar structure 41 preparatory to a return transfer.

In the meantime, the lower transfer bar structure 40 has returned to its retracted position to be positioned to receive the A frame lowered from the heating station 14 onto its middle section (FIG. 2E). Upon the next forward motion of the transfer bar structure 40, the A clamping frame is advanced to the forming station 16 and elevated (FIG. 2F), while the upper transfer bar structure 41 is driven back to a point positioning the B frame over the load station 12.

The lowering gear posts 38 lower the B frame when released from the upper transfer bar structure 41 to a loading position whereat a cut sheet is loaded therein to.

The lower transfer bar structure 40 in the meantime is retracted to allow the loaded B frame to be lowered onto the transfer bar structure 40 to be ready for another cycle.

The transfer bar structure 40 spans three stations and is reciprocated the distance between the stations to enable step by step incremental successive advance of each clamping frame A and B through the stations 12 through 18. FIGS. 3 through 5 show further details of the lower transfer system including lower rails 22 and a transfer bar structure 40 mounted for guided movement on the rails 22 by way bearings 46 (right side only shown in FIGS. 4A, 4B and 5). The rails 22 are supported on the machine fixed framework including support stanchions 48 spaced along the length of the rails 22.

The length of the transfer bar structure 40 corresponds to three of the stations 12 through 18, and sets of spaced locator pins 50A, 50B, 50C are disposed at intervals along the length of the transfer bar structure 40 corresponding to the station spacing. The set of pins 50A, 50B, 50C may be raised and lowered by corresponding power cylinders 52 so as to be received or withdrawn from holes 54 in the bottom of the clamping frames A or B.

When raised, the pins 50A, 50B, 50C secure the clamping frame A or B in position as the transfer bar structure is advanced.

The clamping frames A or B are raised out of contact with the transfer bar structure 40 when advanced into each station 14, 16, 18 (FIG. 4B) to allow retraction. In stations 14 and 16, this raising is accomplished by power cylinders 56 each having an operating rod 58 to which is attached a bar 60 carrying tapered plugs 62 matched to openings in lift plates 64 welded to either end of the clamping frames A or B.

The clamping frames A or B are raised only a short distance in stations 14, 16, i.e., one quarter inch, just sufficient to allow return of the transfer bar structure 40 after retraction of pins 50A, 50B, 50C.

At station 18, the lifting is carried out by the elevator mechanism 36.

FIG. 5 shows one of the four gear posts 66, connected in pairs, with bars 68 welded to the ends to prevent turning and to ensure equal stroking when gear 70 is driven to raise the posts 66 by a drive system 72.

A similar arrangement is formed in the lowering mechanism 38 at station 12.

Figure 6:
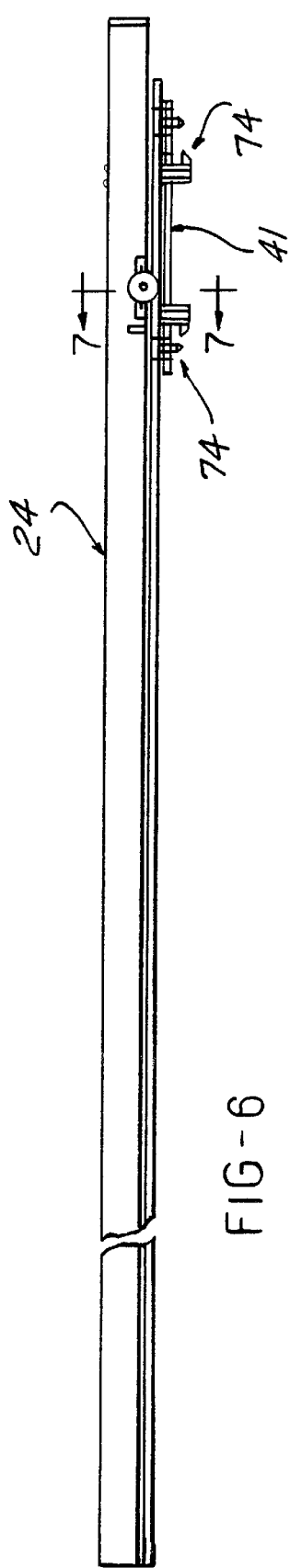
FIG. 6 is a side elevational view of the upper clamping frame transfer system.
Figure 7:
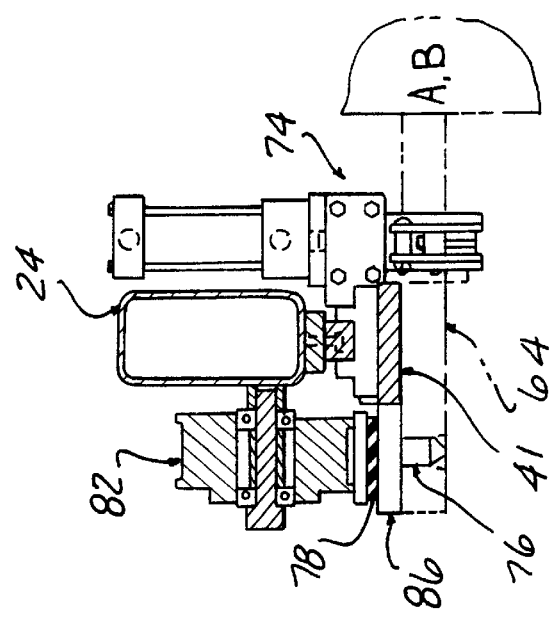
FIG. 7 is a view of the section 7—7 in FIG. 6 with a portion of a captioned clamping frame shown in phantom lines.

FIGS. 6 and 7 show the upper or return transfer system including rails 24 and upper transfer bar structure 41, which carries grippers 74 adapted to engage lift plates 64 of the clamping frames A, B to capture the clamping frames A, B. Downwardly driven locating pins 76 engage holes in the top of the clamping frame A, B.

Figure 8:
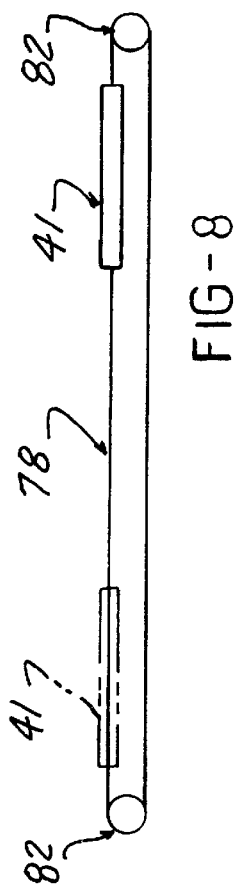
FIG. 8 is a diagrammatic view of the belt drive for the upper transfer system.
Figure 9:
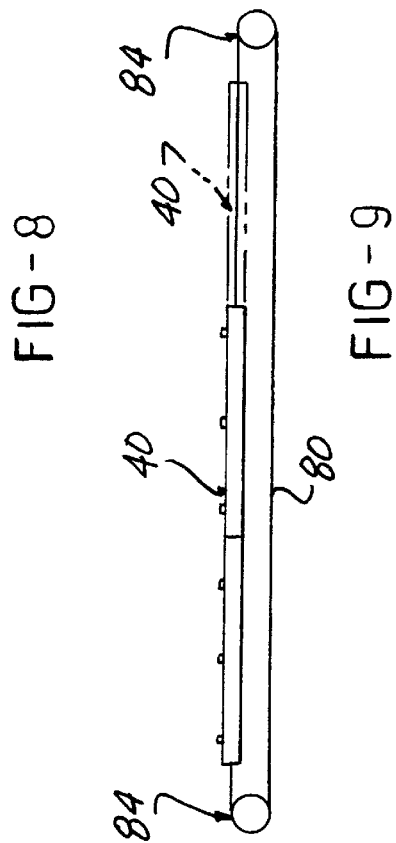
FIG. 9 is a diagrammatic view of the belt drive for the lower transfer system.

Both upper and lower transfer bar structures 40, 41 are driven in either direction by belt pairs 78, 80 passed around sheaves 82, 84 (FIGS. 8, 9) and clamped to cross bars 86, 88. Electric motors (not shown) are used to power the sheaves 82, 84 via drive shafts (not shown) in a conventional manner.

Figure 10:
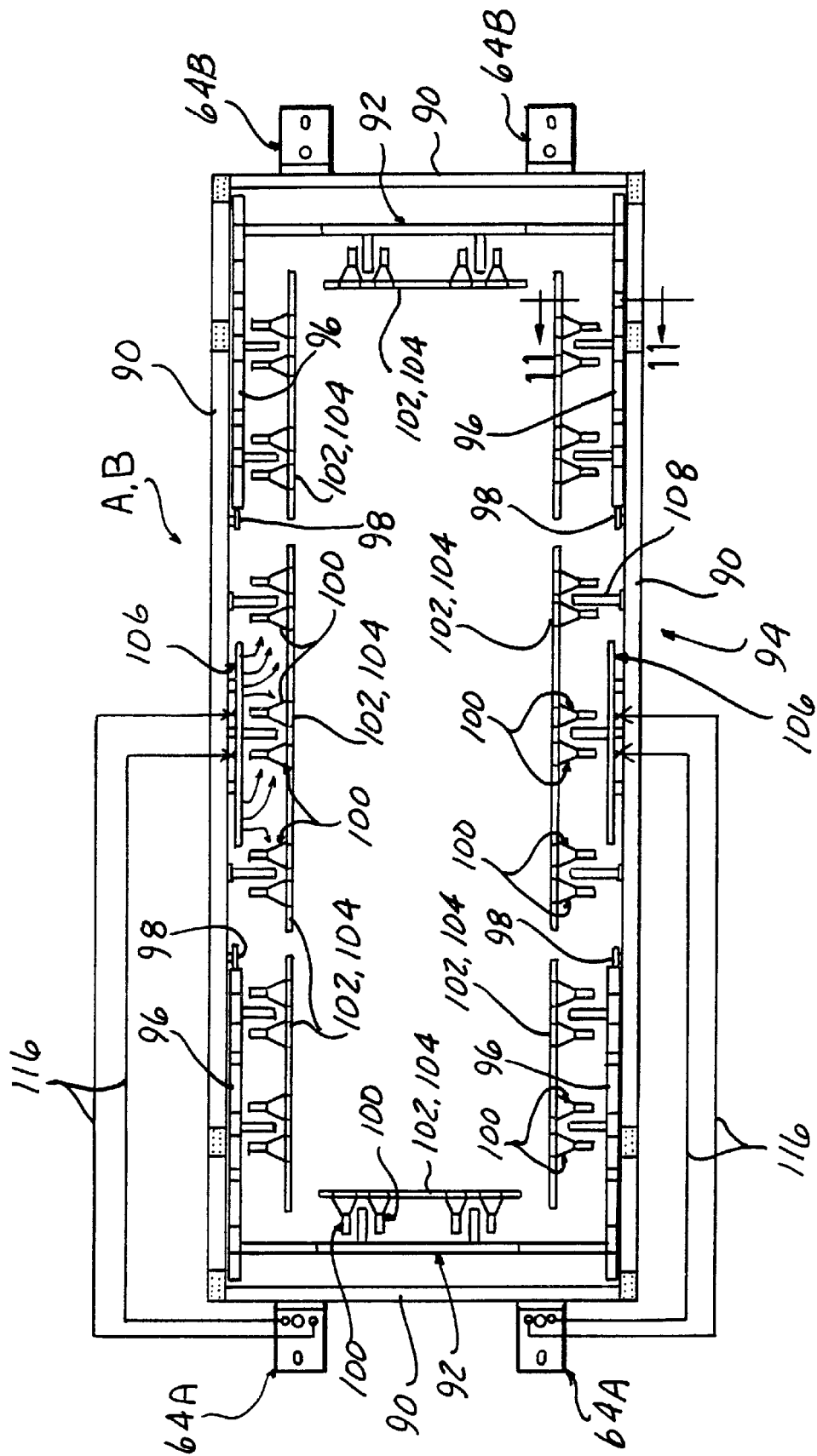
FIG. 10 is a plan view of a clamping frame.

FIG. 10 shows one of the two identical clamping frames A, B which consists of a rectangular open framework 94 formed by lengths of aluminum extrusions forming parallel side and end members 90 connected together at their ends.

U-shaped end sections 92 have legs 96 pivoted at 98 to the inside of each end of the rectangular framework 94.

Figure 11:
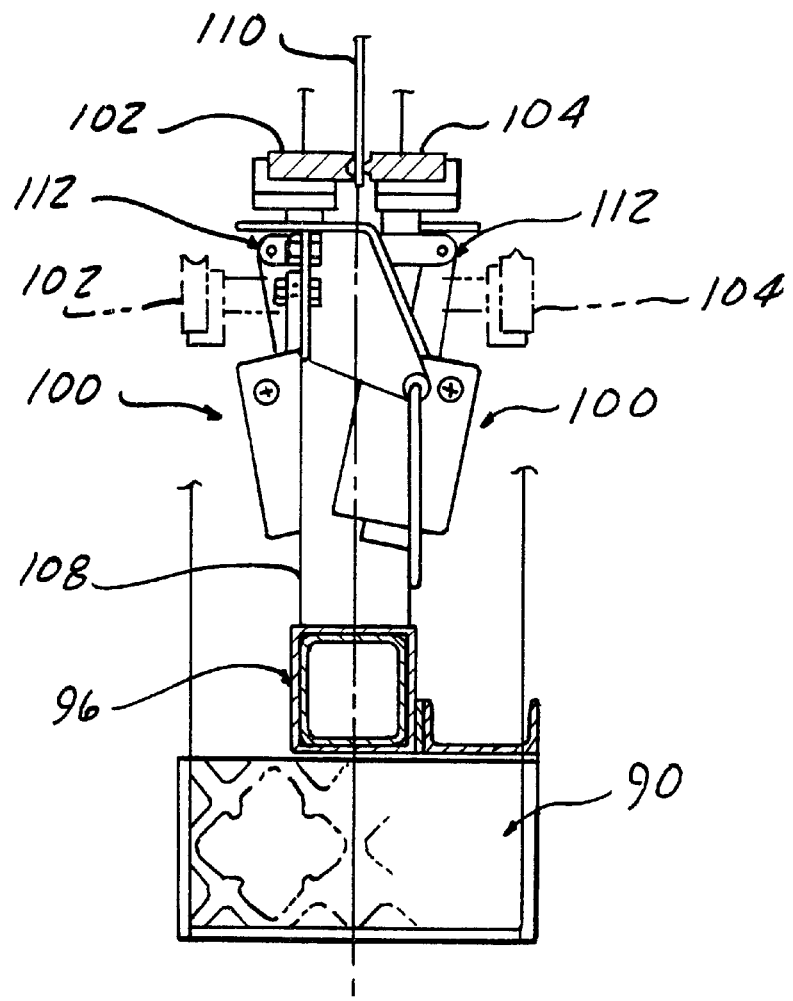
FIG. 11 is a view of section 11—11 in FIG. 10.
Figure 15:
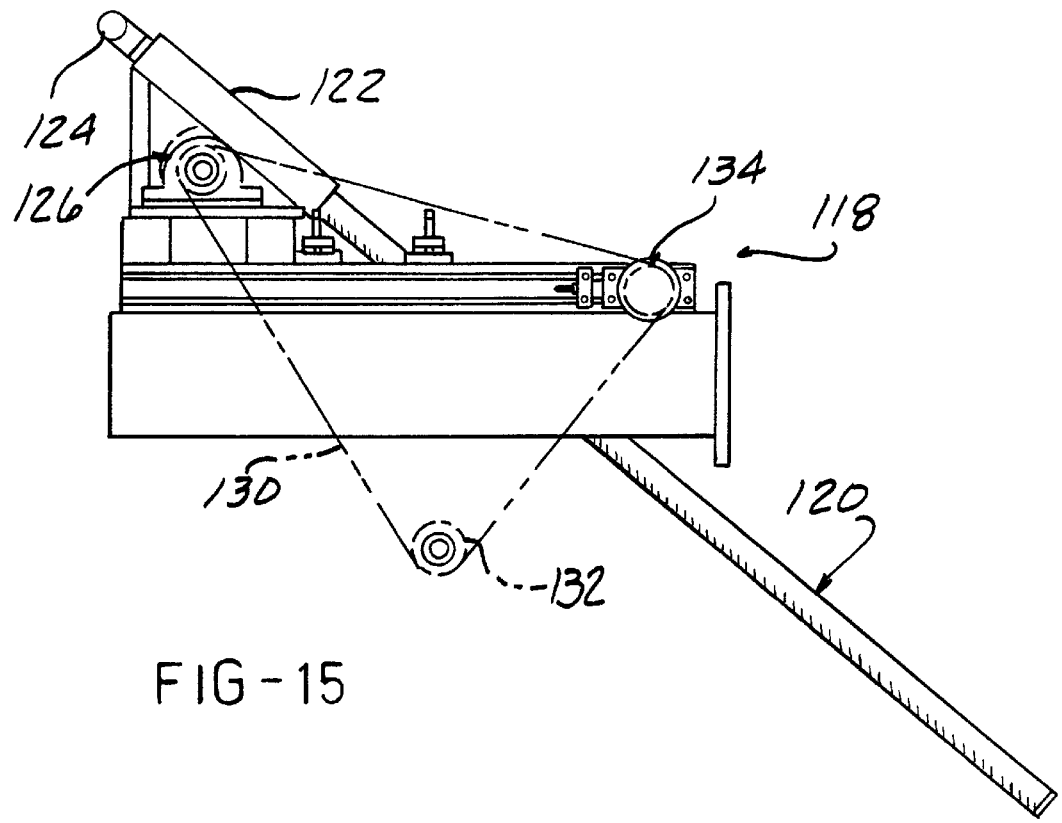
FIG. 15 is an enlarged end view of one of the gear post mechanisms used in the pivoting system shown in FIGS. 12 through 14.
Figure 14:
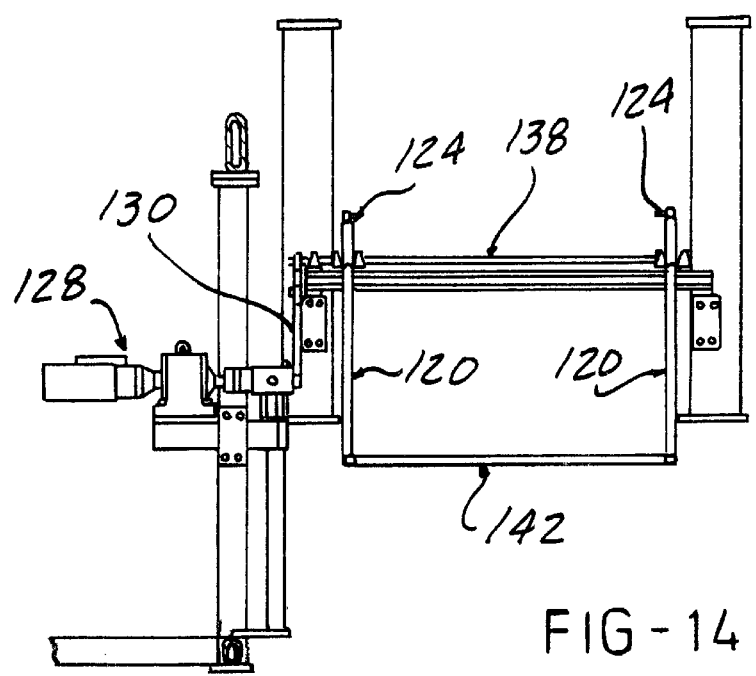
FIG. 14 is a side elevational view of the clamping frame pivoting system.

Arrayed around the inside perimeter of the clamping frames A, B including the end piece 92 are a series of pneumatic sheet clamping cylinder mechanisms 100, arranged in pairs to move pairs of clamping bars 102, 104 (FIG. 11) together as a part to grip or release a rectangular sheet positioned within the generally planar rectangular space defined by the array of clamping cylinder mechanisms 100.

The left end plates 64A have ports connected to fittings for establishing a fluid connection to tubing 116 and manifold plates 106 to actuate or release the pneumatic cylinders 100 (FIG. 10).

The pairs of cylinders 100 are mounted on opposite sides of posts 108, and drive over center linkages 112 associated with respective bars 102, 104.

The bars 102, 104 have complementary interfitting edges which engage the plastic sheet edge 110 when brought together.

The pivoted end sections 92 of the clamping frames A, B are adapted to be swung up in the forming station.

This is accomplished by pivot actuation mechanisms 118 each comprised of pairs of inclined gear posts 120 arranged on either side of the clamping frame A or B (FIGS. 12–16). The gear posts 120 slide within guide tubes 122 and have a cam roller 124 at their upper end.

One side of each gear post 120 has a gear rack formed along its length engaged by a drive gear 126 to be extendible upwardly and retracted thereafter.

A single motor-gear box 128 drives all of the drive gears 126. A drive belt 130 recirculates around a drive pulley 132 driven by the motor gear box 128 which in turn circulates around an adjustable tensioner idler 134 and a pulley 136 on a cross shaft 138 fixed to opposite drive gears 126.

A drive shaft 140 transfers the drive to the opposite right-hand activation mechanism 118.

A connecting bar 142 joins each pair of gear posts 120 together to prevent rotation and ensure joint travel together.

The cam rollers 124 enter one end of guide channels 144 (FIG. 16) on each side of each end of the clamping frames A, B when the gear posts 120 are extended.

Continued travel causes the pivoted section 92 to swing up, bending the sheet portions clamped therein.

Figure 16:
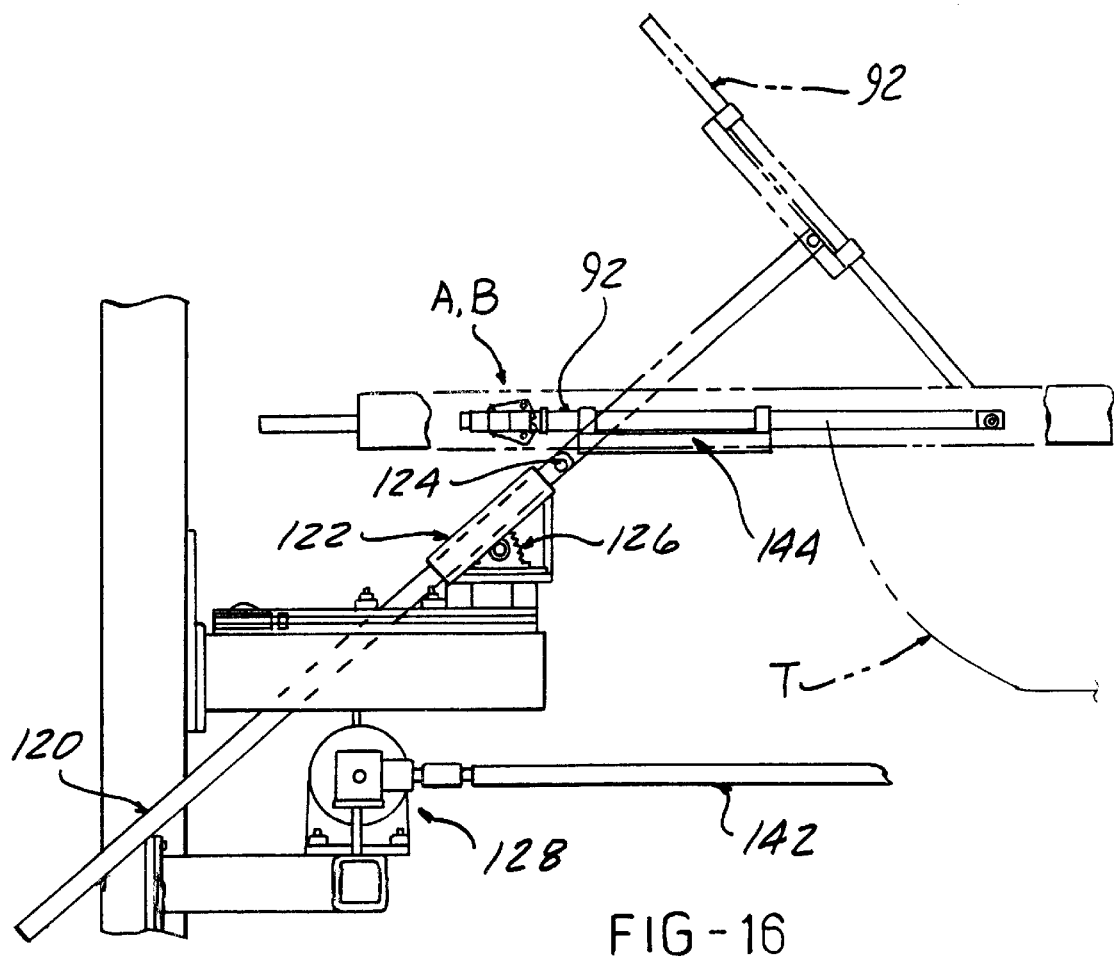
FIG. 16 is a layout view showing the operation of one side of the clamping frame pivoting mechanism.

The sheet is thus bent into much closer conformity with the male tool T preparatory to the vacuum stretching onto the tool T as seen in FIG. 16, greatly reducing the stretching of the sheet material.

The gear posts 120 can then be retracted, releasing the clamping frame A or B to be lowered onto the transfer bar structure 20 and advanced to the return station.

The clamping frames A, B lifting plates 64A have fluid ports to supply the cylinders 100.

Figure 17:
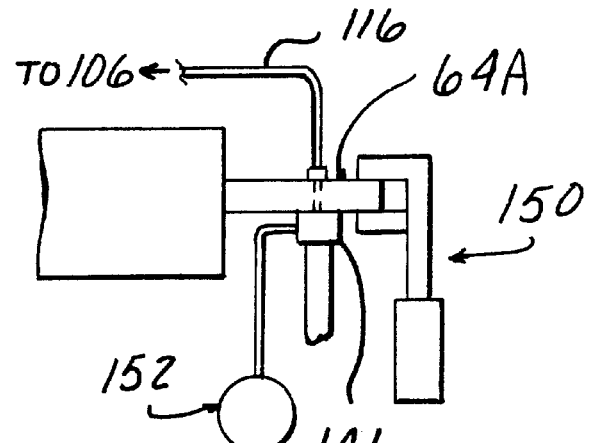
FIG. 17 is a diagrammatic view of the manifold fluid connection to the clamping frame pneumatic cylinders.

A manifold bar 146 (FIG. 17) is provided at the load station 12 and forming station 16.

When the frame A, B is elevated the bar 146 has aligned ports sealed to ports on the plates 64A.

A separate clamping mechanism 150 ensures a sealing engagement and also, in the forming station 16, prevents movement of the clamping frame A or B. This establishes a fluid connection to a pneumatic supply circuit 152.

Figure 18A:
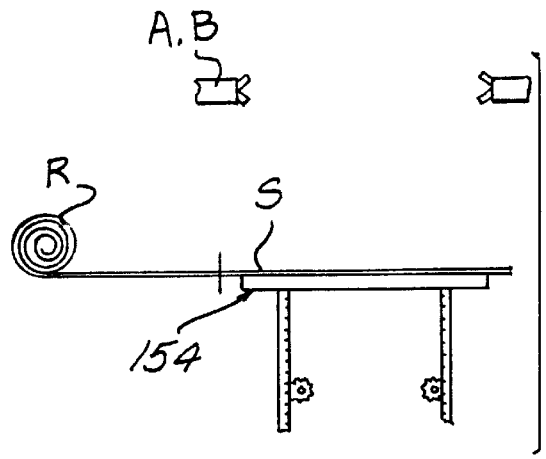
FIGS. 18A and 18B are diagrammatic views depicting the cutting and loading of a sheet into a clamping frame.
Figure 18B:
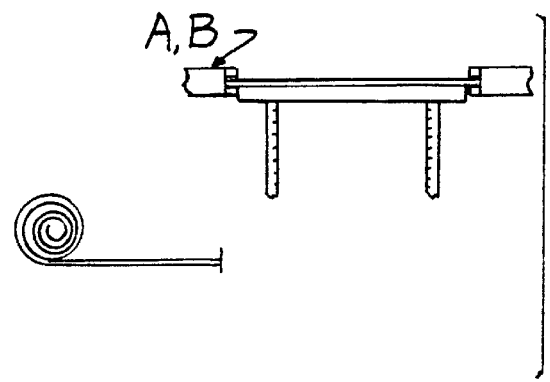

FIGS. 18A, 18B show the principle of sheet loading in station 12.

Material is pulled from a roll of sheet material and over a lift table 154, and then cut off. The material overlaps all four edges. The table 154 is driven up to position the sheet S inside the frame A or B with gripper clamping bars open.

The grippers are activated to grip the sheet edge and complete loading of the sheet into the frame A or B, which is then lowered onto the transfer bar structure 40 as described above.

While two clamping frames have been described, additional clamping frames could be employed in other applications as to reduce the time required to transfer an empty frame back and to reload the same preparatory to a new cycle of heating and forming.

In addition, a series of ovens are sometimes employed, each partially heating the sheets which are transferred successively through the series of ovens to reduce the cycle time. In this design, additional clamping frames will be employed for each oven.

Also, the arrangement is applicable to other thermoforming processes such as "twin sheet" forming, where two sheets are formed into article components and then pressed together to form an integral article.

Finally, this invention allows unlimited additional stations to be easily added by lengthening the line, while still using a reasonable amount of floor space. The stations can be readily added, changed, or deleted to afford great flexibility of the concept to a wide variety of applications.

FIGS. 19–24 diagrammatically depict an alternate form of thermoforming machine 160 in which a pair of frames A, B are successively transferred through a load station, heat station, form station, and standby station as indicated.

In this machine, a pair of rail systems 162, 164 are provided one for each frame A, B and located one above the other. The frames A, B are movable along the associated rail system 162, 164, and the lower rail 164 is movable up and down as will be described, both passing through the heating station between upper and lower ovens 166, 168, both of which being able to be raised and lowered in this embodiment.

Figure 19:
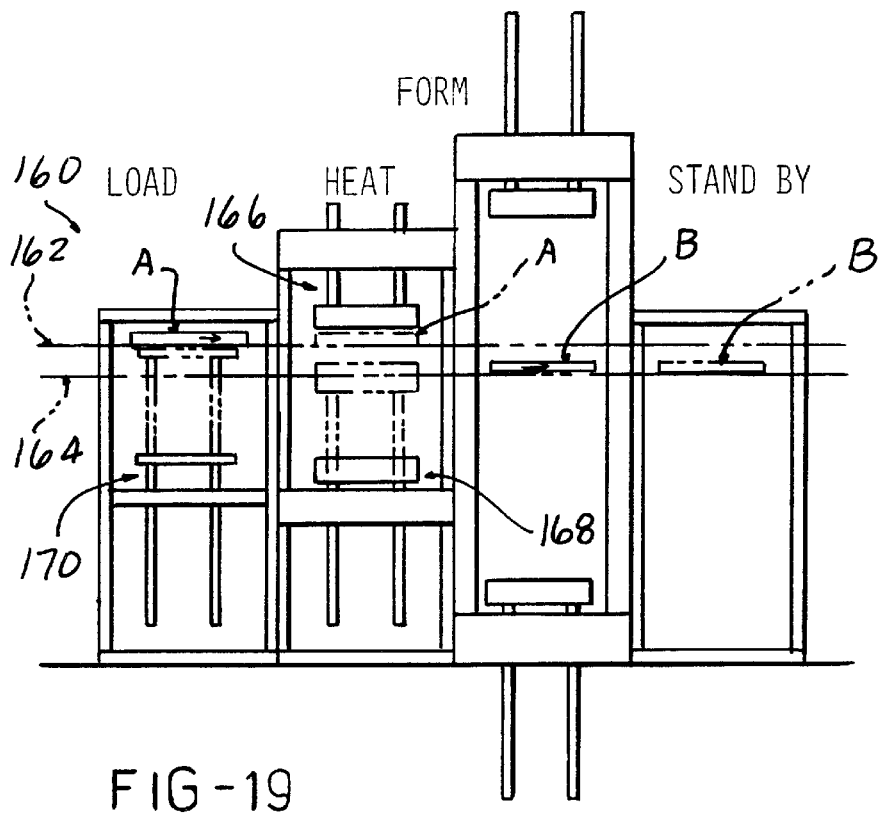
FIGS. 19–24 are diagrammatic views of successive conditions of an alternate form of the invention.

In the condition shown in FIG. 19, frame A is being loaded with a sheet by table 170 preparatory to movement into the heating station. Frame B is in the forming station ready for transfer to the standby station.

Figure 20:
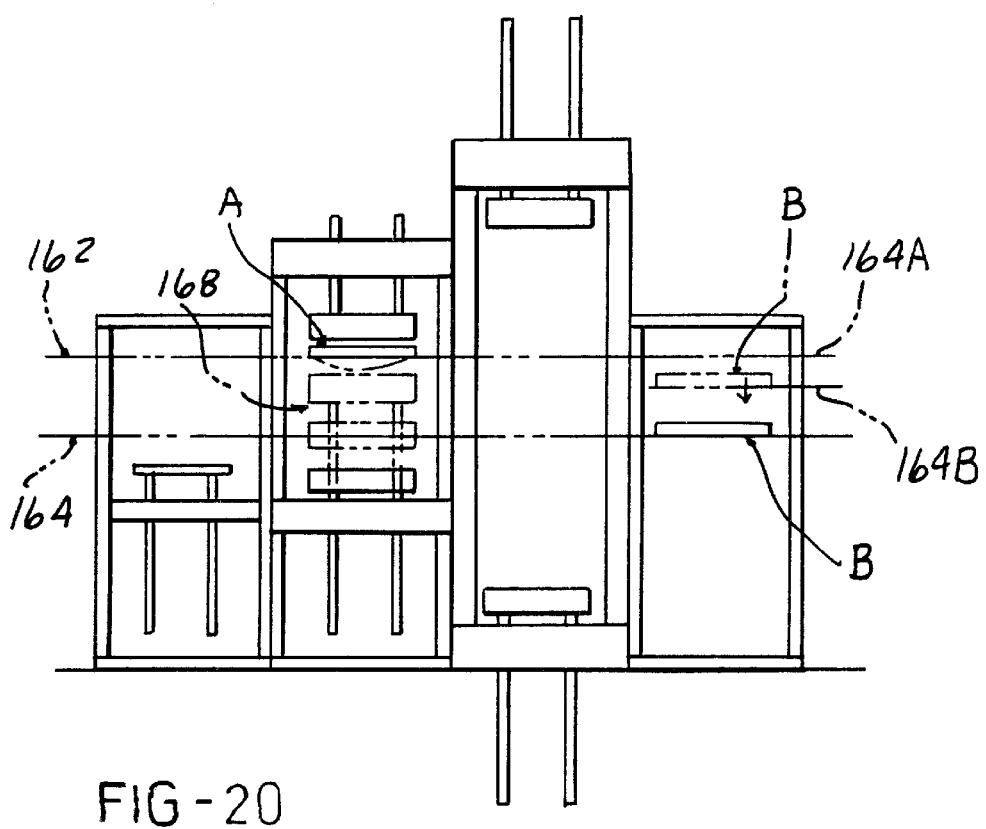

FIG. 20 shows the frame A in the heating station with lower oven 168 raised. The lower rail system 164 is lowered from position A to B, and lower oven 168 is lowered to clear sag of the sheet in frame A.

Figure 21:
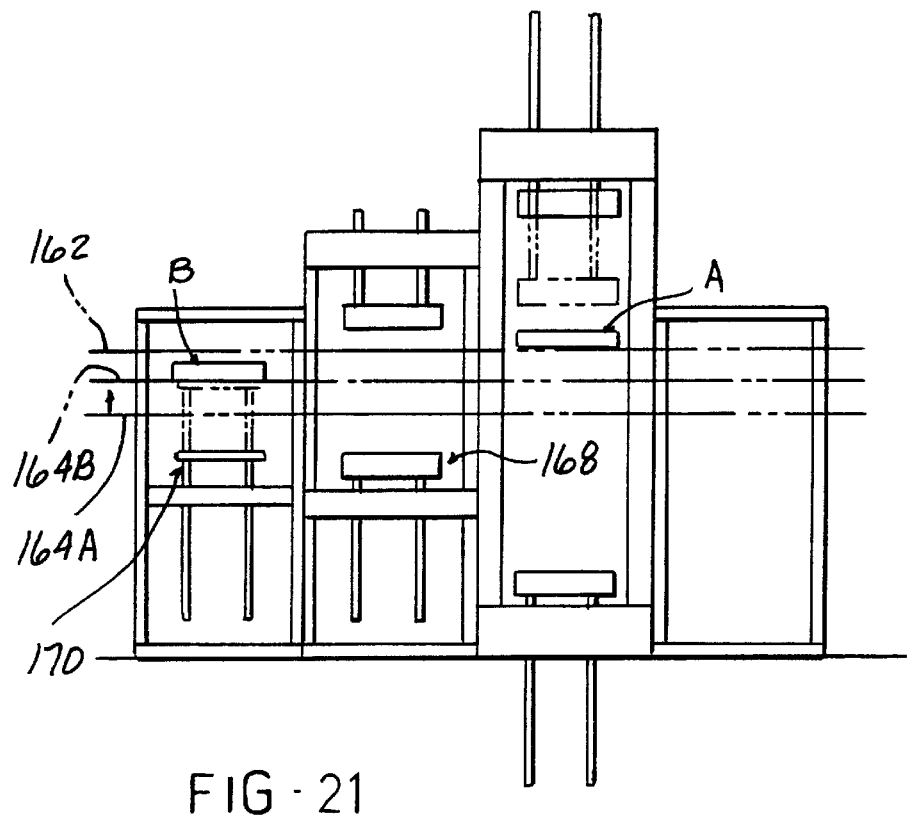

In FIG. 21, frame A has been transferred to the forming station and oven 168 lowered. Forming is being carried out on the sheet in frame A. Frame B has been transferred to the load station and rail 164 raised from position A to B to be loaded by table 170.

Figure 22:
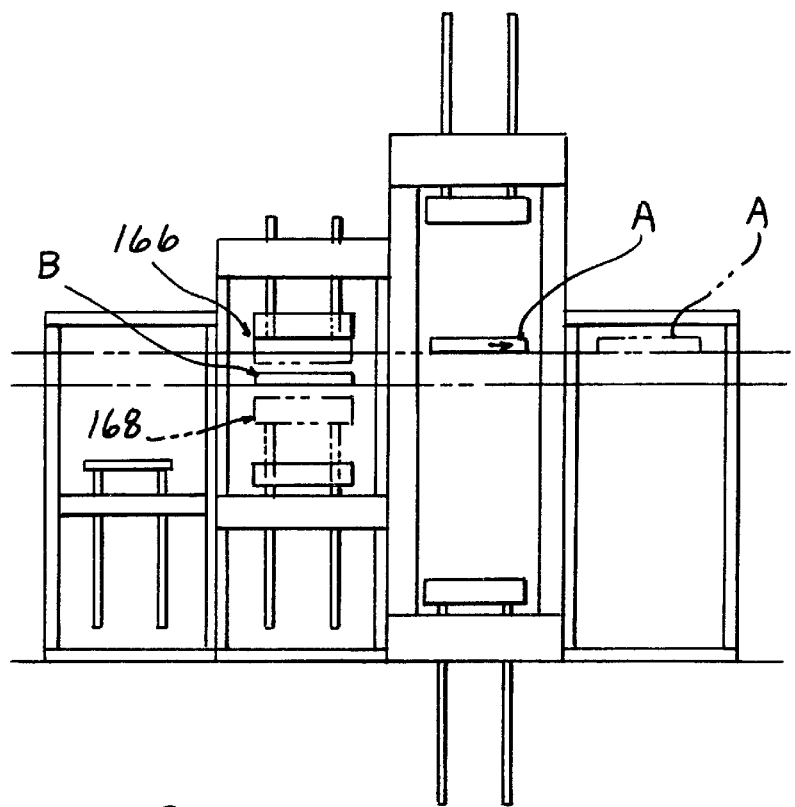
Figure 23:
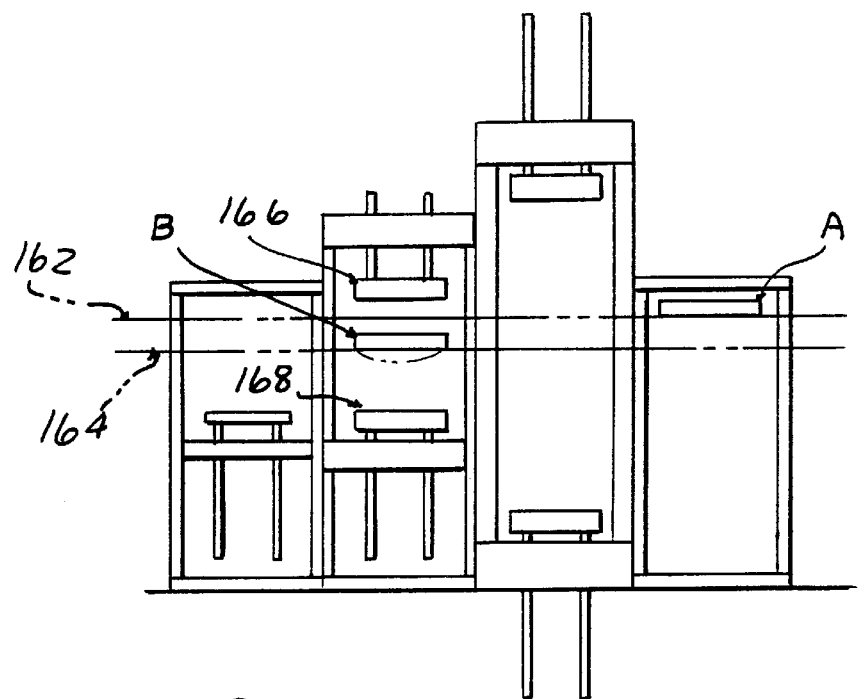

In FIG. 22, frame B is in the heating station and upper oven 166 lowered and lower oven 168 raised.

Frame A is being readied for transfer to the standby station, after forming and removal of the part and scrap in the forming station.

In FIG. 22, the frame B is heated and lower and upper ovens 166, 168 returned preparatory to transfer to the forming station. The frame A has been transferred to the standby station.

Figure 24:
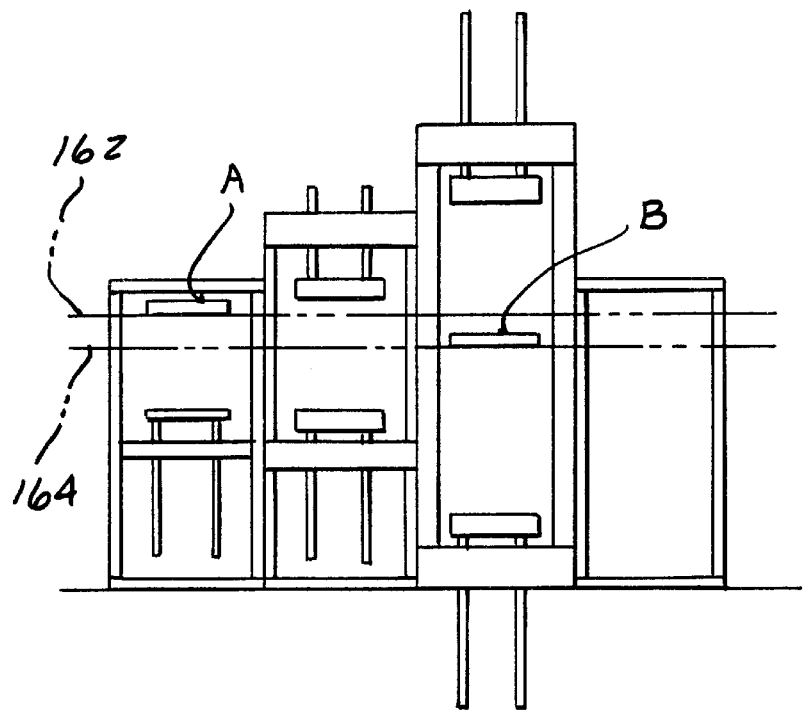

In FIG. 24, the frame A has been returned to the loading station and frame B to the forming station.

This version eliminates the need for making and breaking connections to the frame clamp actuators, but involves movement of the frames back through the oven which could affect the heat cycle, and also requires both upper and lower ovens to move vertically, as well as the lower rail system 164.

What is claimed is:

1. A thermoforming machine for thermoforming a sheet to be loaded into a rectangular space within a generally planar clamping frame included in the machine, said clamping frame advanced into a forming station from a heating station by a transfer system;

an array of sheet clamping mechanisms on said clamping frame arranged around said rectangular space for clamping a sheet loaded into said rectangular space;

said clamping frame having at least one end section pivotally mounted at one end of said rectangular space and carrying a segment of said clamping mechanism array to allow bending movement of said sheet out of the plane of said rectangular space;

a pivot actuation device not connected to said clamping frame including a member movably extendible towards said clamping frame to come into engagement with said pivoted end section of said clamping frame and pivot the same with respect to the remainder of said pivot frame preparatory to forming said sheet in said forming station;

said pivot actuation device including a drive device controllably operable to cause said extending movement of said member to engage and thereby pivot said clamping frame end section to a controlled degree with respect to said rectangular space, whereby a sheet clamped in said rectangular space is bent to be preformed to an extent depending on the degree of pivoting of said pivoted end section of said clamping frame; said member disengageable from said end section to allow said transfer system to move said clamping frame out of said forming station.

2. The thermoforming machine according to claim 1 wherein a second end section is included in said clamping frame pivoted at an opposite end of said rectangular space, having another portion of said clamping mechanism array mounted thereto;

another pivot actuation device separate from said clamping frame including a member movably extendible towards said clamping frame to come into engagement with said another pivoted end section of said clamping frame and pivot the same with respect to said rectangular space preparatory to forming said sheet in said forming station;

said another pivot actuation device including a drive device controllably operable to cause said extending movement of said member to engage and thereby pivot said clamping frame another end section to a controlled degree with respect to said rectangular space, whereby a sheet clamped in said frame is bent to be preformed to an extent depending on the degree of pivoting of both said pivoted end sections.

3. The thermoforming machine according to claim 1 wherein said pivoted end section includes a channel on one side thereof and a cam roller on said member moved into said channel by extending of said member, said member angled with respect to said channel to cause pivoting of said end section as said member extends towards said clamping frame by movement of said cam roller down said channel.

4. The thermoforming machine according to claim 1 wherein said actuation device includes another member extendible towards said clamping frame, each of said members located on a respective side of said end section and each of said members engageable with a respective side of said end section.

5. The thermoforming machine according to claim 3 wherein said member comprises an angled post driven by said drive device to bring said cam roller into and out of engagement with said channel.

6. The thermoforming machine according to claim 1 wherein said clamping frame comprises an open framework formed by two opposite sides and two opposite ends all fixed together, and said end section comprises a U-shaped piece pivoted within one end of said open framework and having clamping mechanisms mounted to opposite legs and an end of said U-shaped piece, said pivoting provided by a pivot connection at the end of each leg to allow pivoting of said end section out of said open framework.

* * * * *